United States Patent
Kenefake et al.

(10) Patent No.: US 11,415,348 B2
(45) Date of Patent: Aug. 16, 2022

(54) METHODS FOR REMOVAL OF MOISTURE FROM LNG REFRIGERANT

(71) Applicant: ExxonMobil Upstream Research Company, Spring, TX (US)

(72) Inventors: Daryl A. Kenefake, The Woodlands, TX (US); Jeffrey Tatarzyn, Spring, TX (US); Waleed H. Amhed, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 268 days.

(21) Appl. No.: 16/735,036

(22) Filed: Jan. 6, 2020

(65) Prior Publication Data

US 2020/0240687 A1 Jul. 30, 2020

Related U.S. Application Data

(60) Provisional application No. 62/798,722, filed on Jan. 30, 2019.

(51) Int. Cl.
*F25B 43/00* (2006.01)
*F25J 1/00* (2006.01)
*F25J 1/02* (2006.01)

(52) U.S. Cl.
CPC ........... *F25B 43/003* (2013.01); *F25J 1/0022* (2013.01); *F25J 1/0235* (2013.01); *F25J 2210/62* (2013.01)

(58) Field of Classification Search
CPC .... F25J 2220/68; F25J 2270/90; F25J 1/0204; F25J 1/0022; F25J 1/0235; F25J 2210/62;
(Continued)

(56) References Cited

U.S. PATENT DOCUMENTS

| | | | |
|---|---|---|---|
| 1,914,337 A | 6/1933 | Belt | |
| 1,974,145 A | 9/1934 | Atwell | ............ 183/120 |

(Continued)

FOREIGN PATENT DOCUMENTS

| | | | |
|---|---|---|---|
| CN | 102628635 | 10/2014 | ............ F25J 3/08 |
| DE | 1960515 | 5/1971 | ............ F25J 1/02 |

(Continued)

OTHER PUBLICATIONS

U.S. Appl. No. 15/347,968, filed Nov. 10, 2016, Pierre, Fritz Jr. et al.

(Continued)

*Primary Examiner* — Joseph F Trpisovsky
(74) *Attorney, Agent, or Firm* — ExxonMobil Upstream Research Company—Law Department

(57) ABSTRACT

Methods and systems for removing moisture from refrigerant that use a desiccant-based moisture removal unit can be used in the production of liquid natural gas (LNG). For example, a method can include: compressing a refrigerant; conveying at least a portion of the refrigerant to a moisture removal unit comprising a desiccant to form dehydrated refrigerant; cooling and condensing the dehydrated refrigerant to provide a cooled dehydrated liquid refrigerant; conveying the cooled dehydrated refrigerant to a heat exchanger; and passing a LNG stream rich in methane through the heat exchanger to cool at least part of the LNG stream by indirect heat exchange with the cooled dehydrated refrigerant.

14 Claims, 2 Drawing Sheets

(58) Field of Classification Search
CPC ............... F25B 2500/14; F25B 43/003; F25B 2339/0441; F25B 2400/0413
See application file for complete search history.

(56) References Cited

U.S. PATENT DOCUMENTS

| | | | |
|---|---|---|---|
| 2,007,271 A | 7/1935 | Frankl | 62/175.5 |
| 2,011,550 A | 8/1935 | Hasche | 62/121 |
| 2,321,262 A | 6/1943 | Taylor | 62/140 |
| 2,475,255 A | 7/1949 | Rollman | 62/170 |
| 2,537,045 A | 1/1951 | Garbo | 62/122 |
| 3,014,082 A | 12/1961 | Woertz, III | 260/676 |
| 3,103,427 A | 9/1963 | Jennings | 62/39 |
| 3,170,872 A * | 2/1965 | Balogh | B01D 36/003 |
| | | | 210/266 |
| 3,175,342 A * | 3/1965 | Balogh | F25B 43/003 |
| | | | 96/132 |
| 3,180,709 A | 4/1965 | Yendall et al. | 23/210 |
| 3,347,055 A | 10/1967 | Blanchard et al. | 62/9 |
| 3,370,435 A | 2/1968 | Arregger | 62/28 |
| 3,400,512 A | 9/1968 | McKay | 55/69 |
| 3,400,547 A | 9/1968 | Williams et al. | 62/55 |
| 3,511,058 A | 5/1970 | Becker | 62/9 |
| 3,724,226 A | 4/1973 | Pachaly | 62/39 |
| 3,878,689 A | 4/1975 | Grenci | 62/9 |
| 4,281,518 A | 8/1981 | Muller et al. | 62/12 |
| 4,415,345 A | 11/1983 | Swallow | 62/28 |
| 4,609,388 A | 9/1986 | Adler et al. | 62/12 |
| 4,769,054 A | 9/1988 | Steigman | 62/12 |
| 5,025,860 A | 6/1991 | Mandrin | 166/267 |
| 5,089,119 A * | 2/1992 | Day | F25B 43/003 |
| | | | 210/167.32 |
| 5,137,558 A | 8/1992 | Agrawal | 62/24 |
| 5,139,547 A | 8/1992 | Agrawal et al. | 62/8 |
| 5,141,543 A | 8/1992 | Agrawal et al. | 62/8 |
| 5,575,833 A | 11/1996 | Griffin | |
| 5,638,698 A | 6/1997 | Knight et al. | 62/632 |
| 5,950,453 A | 9/1999 | Bowen et al. | 62/612 |
| 6,003,603 A | 12/1999 | Breivik et al. | 166/357 |
| 6,158,242 A | 12/2000 | Lu | 62/637 |
| 6,295,838 B1 | 10/2001 | Shah et al. | 62/643 |
| 6,298,688 B1 | 10/2001 | Brostow et al. | 62/613 |
| 6,308,531 B1 | 10/2001 | Roberts et al. | |
| 6,412,302 B1 | 7/2002 | Foglietta | 62/611 |
| 6,662,589 B1 | 12/2003 | Roberts et al. | 62/425 |
| 6,889,522 B2 | 5/2005 | Prible et al. | 62/612 |
| 7,143,606 B2 | 12/2006 | Tranier | 62/611 |
| 7,278,281 B2 | 10/2007 | Yang et al. | 62/612 |
| 7,386,996 B2 | 6/2008 | Fredheim et al. | 62/612 |
| 7,520,143 B2 | 4/2009 | Spilsbury | 62/620 |
| 7,712,331 B2 | 5/2010 | Dee et al. | 62/612 |
| 8,079,321 B2 | 12/2011 | Balasubramanian | 114/74 |
| 8,435,403 B2 | 5/2013 | Sapper et al. | 208/254 |
| 8,464,289 B2 | 6/2013 | Pan | 725/34 |
| 8,601,833 B2 | 12/2013 | Dee et al. | 62/648 |
| 8,616,012 B2 | 12/2013 | Duerr et al. | 62/89 |
| 8,616,021 B2 | 12/2013 | Minta | |
| 8,747,520 B2 | 6/2014 | Bearden et al. | 95/41 |
| 9,016,088 B2 | 4/2015 | Butts | 62/613 |
| 9,339,752 B2 | 5/2016 | Reddy et al. | B01D 53/002 |
| 9,435,229 B2 | 9/2016 | Alekseev et al. | 60/643 |
| 9,439,077 B2 | 9/2016 | Gupta et al. | H04W 12/12 |
| 9,459,042 B2 | 10/2016 | Chantant et al. | 62/50.2 |
| 2004/0025532 A1 * | 2/2004 | Scaringe | F25B 43/003 |
| | | | 62/474 |
| 2006/0000615 A1 | 1/2006 | Choi | 166/352 |
| 2006/0107688 A1 * | 5/2006 | Hwang, II | F25B 45/00 |
| | | | 62/474 |
| 2006/0179864 A1 * | 8/2006 | Choi | F25B 41/40 |
| | | | 62/292 |
| 2007/0277674 A1 | 12/2007 | Hirano et al. | 95/290 |
| 2009/0217701 A1 | 9/2009 | Minta et al. | 62/612 |
| 2010/0192626 A1 | 8/2010 | Chantant | 62/606 |
| 2010/0251763 A1 | 10/2010 | Audun | 62/614 |
| 2011/0036121 A1 | 2/2011 | Roberts et al. | 62/612 |
| 2011/0126451 A1 | 6/2011 | Pan et al. | 44/451 |
| 2011/0259044 A1 | 10/2011 | Baudat et al. | 62/611 |
| 2012/0031144 A1 * | 2/2012 | Northrop | F25J 3/0209 |
| | | | 62/617 |
| 2012/0285196 A1 | 11/2012 | Fiinn et al. | 62/620 |
| 2013/0074541 A1 | 3/2013 | Kaminsky et al. | 62/601 |
| 2013/0199238 A1 | 8/2013 | Mock et al. | 62/611 |
| 2014/0130542 A1 | 5/2014 | Brown et al. | 62/612 |
| 2015/0285553 A1 | 10/2015 | Oelfke et al. | 62/611 |
| 2017/0010041 A1 | 1/2017 | Pierre, Jr. et al. | 62/616 |
| 2017/0016667 A1 | 1/2017 | Huntington et al. | 62/614 |
| 2017/0016668 A1 | 1/2017 | Pierre, Jr. et al. | 62/614 |
| 2017/0030628 A1 * | 2/2017 | Sanders | F25D 21/04 |
| 2017/0129309 A1 * | 5/2017 | Lee | F25B 6/02 |

FOREIGN PATENT DOCUMENTS

| | | | |
|---|---|---|---|
| DE | 2354726 | 5/1975 | ............... F17C 9/04 |
| DE | 3149847 | 7/1983 | ............... B01D 5/00 |
| DE | 19906602 | 8/2000 | ............... F25J 3/08 |
| DE | 102013007208 | 10/2014 | ............... B01D 3/14 |
| EP | 1715267 | 10/2006 | ............... F25J 3/02 |
| EP | 1972875 | 9/2008 | ............... F25J 3/04 |
| EP | 2157013 | 8/2009 | ............... F17C 3/02 |
| EP | 2629035 | 8/2013 | ............... F25J 1/00 |
| EP | 3012555 | 4/2016 | |
| FR | 2756368 | 5/1998 | ............... B01D 53/26 |
| GB | 1376678 | 12/1974 | ............... F25J 1/02 |
| GB | 1596330 | 8/1981 | ............... F25J 1/02 |
| GB | 2172388 | 9/1986 | ............... E21B 43/16 |
| GB | 2333148 | 7/1999 | ............... F25J 1/02 |
| GB | 2470062 | 11/2010 | ............... F25J 1/02 |
| GB | 2486036 | 11/2012 | ............... F25J 1/02 |
| JP | 59216785 | 12/1984 | ............... F25J 1/02 |
| JP | 2530859 | 4/1997 | ............... G02F 1/13 |
| JP | 2001-133084 | 5/2001 | |
| JP | 5705271 | 11/2013 | ............... F25J 3/00 |
| JP | 5518531 | 6/2014 | ............... Y02P 20/152 |
| KR | 2010/0112708 | 10/2010 | ............... F17C 5/00 |
| KR | 2011/0079949 | 7/2011 | ............... F25J 3/02 |
| WO | WO2006/120127 | 11/2006 | ............... F25J 3/02 |
| WO | WO2008/133785 | 11/2008 | ............... B63B 25/08 |
| WO | WO2011/101461 | 8/2011 | ............... B63B 25/16 |
| WO | WO2012/031782 | 3/2012 | ............... F25J 1/02 |
| WO | WO2014/048845 | 4/2014 | ............... F25J 1/02 |
| WO | WO2015/110443 | 7/2015 | ............... F25J 1/00 |
| WO | WO2017/011123 | 1/2017 | ............... F25J 3/08 |
| WO | WO2017/067871 | 4/2017 | ............... F01D 15/10 |

OTHER PUBLICATIONS

U.S. Appl. No. 15/347,983, filed Nov. 10, 2016, Pierre, Fritz Jr. et al.
U.S. Appl. No. 15/348,004, filed Nov. 10, 2016, Pierre, Fritz Jr. et al.
U.S. Appl. No. 15/348,533, filed Nov. 10, 2016, Pierre, Fritz Jr.
U.S. Appl. No. 62/458,127, filed Feb. 13, 2017, Pierre, Fritz Jr.
U.S. Appl. No. 62/458,131, filed Feb. 13, 2017, Pierre, Fritz Jr.
U.S. Appl. No. 62/463,274, filed Feb. 24, 2017, Kaminsky, Robert D. et al.
U.S. Appl. No. 62/478,961, Balasubramanian, Sathish.
Bach, Wilfried (1990) "Offshore Natural Gas Liquefaction with Nitrogen Cooling—Process Design and Comparison of Coil-Wound and Plate-Fin Heat Exchangers," *Science and Technology Reports*, No. 64, Jan. 1, 1990, pp. 31-37.
Chang, Ho-Myung et al, (2019) "Thermodynamic Design of Methane Liquefaction System Based on Reversed-Brayton Cycle" Cryogenics, pp. 226-234.
ConocoPhillips Liquefied Natural Gas Licensing (2017) "Our Technology and Expertise are Ready to Work Toward Your LNG Future Today," htip://lnglicensing.conocophillips.com/Documents/15-1106%20LNG%20Brochure_March2016.pdf, Apr. 25, 2017, 5 pgs.
Danish Technologies Institute (2017) "Project—Ice Bank System with Pulsating and Flexible Heat Exchanger (IPFLEX)," https://www.dti.dk/proiects/proiect-ice-bank-system-with-pulsating-andflexible-heat-exchanger-ipflex/37176.

(56) References Cited

OTHER PUBLICATIONS

Diocee, T. S. et al. (2004) "Atlantic LNG Train 4-The Worlds Largest LNG Train", *The 14th International Conference and Exhibition on Liquefied Natural Gas (LNG 14)*, Doha, Qatar, Mar. 21-24, 2004, 15 pgs.
Khoo, C. T. et al. (2009) "Execution of LNG Mega Trains-The Qatargas 2 Experience," *WCG*, 2009, 8 pages.
Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.
McLachlan, Greg (2002) "Efficient Operation of LNG From The Oman LNG Project," *Shell Global Solutions International B.V.*, Jan. 1, 2002, pp. 1-8.
Olsen, Lars et al. (2017).
Ott, C. M. et al. (2015) "Large LNG Trains: Technology Advances to Address Market Challenges", *Gastech*, Singapore, Oct. 27-30, 2015, 10 pgs.
Publication No. 43031 (2000) Research Disclosure, Mason Publications, Hampshire, GB, Feb. 1, 2000, p. 239, XP000969014, ISSN: 0374-4353, paragraphs [0004], [0005] & [0006].
Publication No. 37752 (1995) Research Disclosure, Mason Publications, Hampshire, GB, Sep. 1, 1995, p. 632, XP000536225, ISSN: 0374-4353, 1 page.
Ramshaw, Ian et al. (2009) "The Layout Challenges of Large Scale Floating LNG," *ConocoPhillips Global LNG Collaboration*, 2009, 24 pgs, XP009144486.
Riordan, Frank (1986) "A Deformable Heat Exchanger Separated by a Helicoid," *Journal of Physics A: Mathematical and General*, v. 19.9, pp. 1505-1515.
Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.
Shah, Pankaj et al. (2013) "Refrigeration Compressor Driver Selection and Technology Qualification Enhances Value for the Wheatstone Project," *17th Int'l Conf. & Exh. in LNG*, 27 pgs.
Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.
Tianbiao, He et al. (2015), Optimal Synthesis of Expansion Liquefaction Cycle for Distributed-Scale LNG, *Institute of Refrigeration and Cryogenics, Shanghai Jiao Tong University*, pp. 268-280.
Tsang, T. P. et al. (2009) "Application of Novel Compressor/Driver Configuration in the Optimized Cascade Process," *2009 Spring Mtg. and Global Conf. on Process Safety-9th Topical Conf. on Gas Utilization*, 2009, Abstract, 1 pg. https://www.aiche.org/conferences/aiche-spring-meeting-and-globalcongress-on-process-safety/2009/proceeding/paper/7a-application-novel-compressordriver-configurationoptimized-cascader-process.

\* cited by examiner

METHODS FOR REMOVAL OF MOISTURE FROM LNG REFRIGERANT

CROSS REFERENCE TO RELATED APPLICATIONS

This application claims the priority benefit of U.S. Provisional Patent Application No. 62/798,722, filed Jan. 30, 2019, entitled METHODS FOR REMOVAL OF MOISTURE FROM LNG REFRIGERANT.

BACKGROUND

The present disclosure relates to preventing water accumulation in a cryogenic refrigeration circuit. Processing of cryogenic hydrocarbon liquids, such as liquefied natural gas (LNG), conventionally utilizes refrigeration to cool inlet gasses to a required liquefaction temperature (e.g., methane is cooled to make LNG). Refrigerant gasses used in refrigeration circuits may be single component (e.g., methane, nitrogen, propane, ethylene, and the like) or mixed refrigerants. Mixed refrigerants are mixtures that may include, but are not limited to, methane, nitrogen, ethane, ethylene, propane, and other commercial refrigerant compounds. Refrigeration circuits are initially charged with refrigerant and due to some loss during process runs, additional refrigerant material may be added periodically to make up the required volume. Neither the initial refrigerant nor make-up refrigerant are typically completely devoid of water, thus small amounts of water often find a way into the refrigeration circuit. At places where the system is below the freezing point of water (e.g., within the tubes of the heat exchangers), this water may form an ice film. When heat exchangers are taken out of service and warmed up (e.g., for planned maintenance, unplanned downtime, etc.), this distributed solid film melts and forms pools of liquid water in these heat exchangers. Upon re-cooling the heat exchanger to return to operating conditions, the water may freeze, which can damage the heat exchangers and decrease efficiency in the production of LNG. Therefore, it is common practice to remove the liquid water from the refrigeration circuit before re-cooling.

As a standard of practice in the industry today, water is typically removed from the refrigeration circuit by "de-frosting." In de-frosting, refrigerant is fully de-inventoried from the refrigeration circuit and disposed of (e.g., burned). Dry gasses are then passed through all refrigeration circuit conduits (piping/tubing), valves, and heat exchangers to warm up the refrigeration circuit components and vaporize any accumulated water. This water is swept away by the dry gas stream and burned in the facility flare. This procedure is time intensive, requires a substantial amount of off-line time, is costly, and is wasteful. A more efficient method for removing moisture from a refrigeration circuit is thus needed.

SUMMARY OF THE INVENTION

The present disclosure relates to preventing water accumulation in the refrigeration circuit of a liquefied natural gas (LNG) plant by passing refrigerant through a moisture removal unit.

In one aspect, the present invention provides a system for removing moisture from refrigerant in an LNG refrigeration circuit which may include a refrigerant compressor, a refrigerant condenser, a moisture removal unit comprising desiccant, and a heat exchanger that are fluidly connected in a loop wherein the refrigerant compressor is upstream of the moisture removal unit, the moisture removal unit is upstream of the refrigerant condenser, the refrigerant condenser is upstream of the heat exchanger, and the heat exchanger is upstream of the refrigerant compressor.

The system may contain one or more valves capable of splitting the refrigerant stream, for example, conveying a first stream to the moisture removal unit and conveying the second stream to a conduit that bypasses the moisture removal unit.

In another aspect, the present invention provides a method for removing moisture from refrigerant in a LNG refrigeration circuit that includes the step of conveying a refrigerant stream through a moisture removal unit containing a desiccant. The moisture removal unit may be utilized either when the system is taken offline and warmed (e.g., to ambient temperature) or when the refrigeration circuit is online and processing LNG.

In another aspect, the present invention provides a method of cryogenically processing LNG that includes the steps of
a) providing a liquid natural gas stream;
b) providing a refrigerant;
c) compressing the refrigerant;
d) conveying at least a portion of the refrigerant to a moisture removal unit comprising a desiccant to form dehydrated refrigerant;
e) cooling and condensing the dehydrated refrigerant to provide a cooled dehydrated liquid refrigerant;
f) conveying the cooled dehydrated refrigerant to a heat exchanger; and
g) passing the gas stream rich in methane through the heat exchanger to cool at least part of the gas stream by indirect heat exchange with the cooled dehydrated refrigerant.

The method may be useful for processing liquid natural gas having a composition of between about 87 percent by mole to about 97 percent by mole methane.

In any embodiment, the refrigeration circuit may contain one or more valves capable of splitting the refrigerant stream, for example, conveying a first stream to the moisture removal unit and conveying the second stream to a conduit that bypasses the moisture removal unit.

In any embodiment, the moisture removal unit may be a permanent fixture in the refrigeration circuit or may be removably attached to the system. In any embodiment, the desiccant may be, for example, silica, activated charcoal, calcium sulfate (gypsum), calcium chloride, molecular sieves, or any combination thereof. In any embodiment, the moisture removal unit may include a desiccant bed, which may be loose or packed through which the refrigerant flows through, over, or both.

In any embodiment, and optionally, the refrigeration circuit may be fluidly connected to a refrigerant source such that refrigerant may be added to the circuit.

In any embodiment, the refrigeration circuit may include a moisture analysis unit. The moisture analysis unit may monitor the moisture in the refrigerant. The moisture analysis unit may be downstream of the moisture removal unit and may, for example, measure the dew point of the refrigerant.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combi

DETAILED DESCRIPTION

Figure 1:
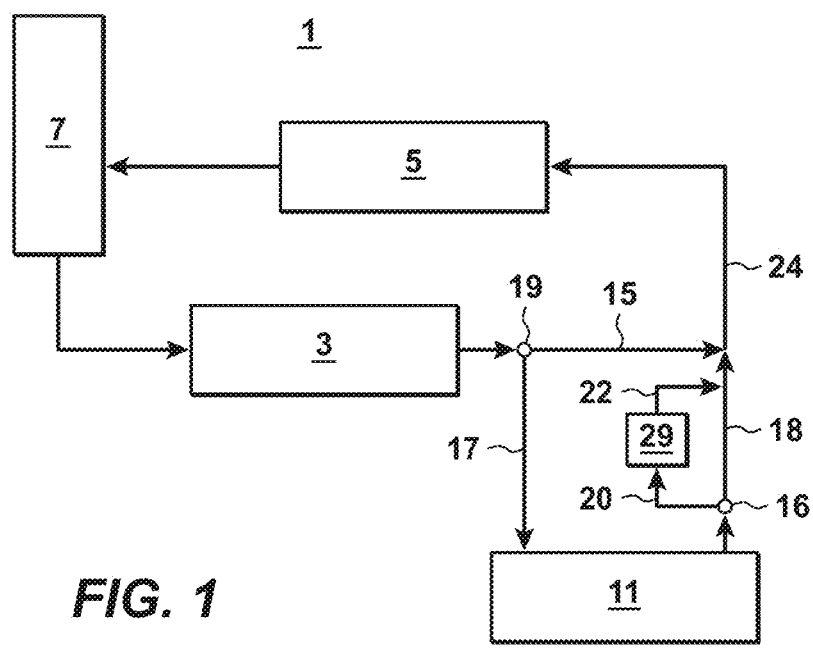
- FIG. 1 illustrates a nonlimiting example of a refrigeration circuit incorporating a moisture removal unit downstream of a compressor and upstream of a condenser.

The present invention now will be described more fully hereinafter, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In one aspect, the present invention provides a method for removing moisture or water from refrigerant in a refrigeration circuit without de-inventorying refrigerant or using large volumes of drying gas.

As used herein, de-inventorying and grammatical variations thereof refer to a process where refrigerant is removed from refrigeration circuit and disposed of or stored elsewhere. Conversely, inventorying and grammatical variations thereof refer to a process where a refrigeration circuit is initially substantially void of refrigerant and refrigerant is added to the circuit sufficient to allow operation of the refrigeration circuit. This may be upon initial use of the refrigeration circuit or after de-inventorying of the refrigeration circuit, for example, to perform repairs. De-inventorying does not encompass redirecting refrigerant through additional piping and valves required to convey refrigerant through a moisture removal unit.

The methods disclosed herein provide methods for removing water from a refrigeration circuit that are not currently or have been previously used in the LNG industry. These methods expand the use of existing equipment and utilize additional equipment, such as, for example, new piping connections and procedures.

Advantageously, since methods disclosed herein do not require de-inventorying the refrigerant from the refrigeration circuit and may not require warming of the refrigeration circuit, cost savings may be realized both by reducing time spent offline and extending the lifetime of refrigerant (and avoiding the purchase of new refrigerant).

As used herein, a "refrigeration circuit" includes the system through which refrigerant is cycled to allow a cooled refrigerant to absorb energy from a gas stream (e.g., natural gas stream). The refrigeration circuit may be part of an industrial system, for example, in the cryogenic processing of gasses to liquid form (e.g., in a liquid natural gas train). Refrigeration circuits may have multiple components, including, but not limited to, refrigerant compressor, refrigerant condenser, heat exchanger, evaporators, or any combination thereof.

Generally, refrigeration circuits have a directional flow when in use. For example, in refrigeration circuits disclosed herein, refrigerant may be compressed into a high-pressure gas by a compressor after which it is conveyed to a condenser to liquefy and cool the refrigerant. The cooled, liquid refrigerant is then conveyed to the heat exchanger where energy from the gas stream (e.g., natural gas) may be absorbed by the refrigerant, cooling and liquefying the gas stream, thus achieving the purpose of the refrigeration circuit. This disclosure considers these components and steps in this order, and uses the terms "downstream" and "upstream" to indicate fluid flow direction as it would be when the system is in functional use (e.g., cooling). As used herein, the term "downstream" is used to indicate that it is in the direction of refrigerant flow. "Upstream" is used to indicate that it is in the direction opposite of refrigerant flow.

As used herein, the term "cryogenic" is intended to mean a liquid, gas, or mixed phase fluid having a temperature less than −70 degrees Celsius. Examples of cryogens include liquid nitrogen (LIN), liquefied natural gas (LNG), liquid helium, liquid carbon dioxide and pressurized, mixed phase cryogens (e.g., a mixture of LIN and gaseous nitrogen). As used herein, the term "cryogenic temperature" is intended to mean a temperature below −70 degrees Celsius.

As used herein, the term "compressor" broadly means any device or series of devices capable of compressing refrigerant into a high-pressure gas. Although the singular form of compressor is used herein, it is contemplated as within the scope of the invention that "compressor" includes any system, including those that may have multiple components that compress refrigerant into a high-pressure gas. One of skill in the art will be familiar with a variety of suitable compressor systems, including, but not limited to, mechanical, low speed, high speed, and centrifugal.

As used herein, the term "condenser" broadly means any device or series of devices capable of condensing a high-pressure refrigerant into liquid form. Although referred, the singular form of condenser is used herein, it is contemplated as within the scope of the invention that "condenser" includes any system, including those that may have multiple components, which condense high-pressure refrigerant into a cooled liquid. One of skill in the art will be familiar with a variety of suitable condenser systems.

As used herein, the term "heat exchanger" broadly means any device or devices capable of transferring heat from one media to another media, including particularly any structure, e.g., device commonly referred to as a heat exchanger. Although referred, the singular form of heat exchanger is used herein, it is contemplated as within the scope of the invention that "heat exchanger" includes any system, including those that may have multiple components, which enable transfer of energy from one source (e.g., natural gas stream) to the refrigerant. One of skill in the art will be familiar with suitable heat exchangers. For example, in LNG applications, coil wound heat exchangers and brazed aluminum heat exchangers are typically employed.

The present disclosure further incorporates into the refrigeration circuit a moisture removal unit or access to a moisture removal unit. As used herein, "moisture removal unit" refers to a component or series of components that can remove moisture from refrigerant and has an inlet conduit connecting the moisture removal unit to the refrigeration circuit and an outlet conduit, which feeds back into the refrigeration circuit. Although the singular form of moisture removal unit is used herein, it is contemplated as within the scope of the invention that "moisture removal unit" includes any system, including those that may have multiple components, that removes moisture from the refrigerant.

Optimally, a moisture analysis unit capable of monitoring the moisture content of the refrigerant may be included in the refrigeration circuit. For example, a moisture analysis unit may be incorporated within a conduit downstream of the moisture removal unit and upstream of the condenser. The moisture analysis unit and required conduits may be incorporated in series (where the entire refrigerant stream is conveyed to the moisture analysis unit) or in parallel (e.g., where only a portion of the refrigerant stream is conveyed to the moisture analysis unit).

One of skill in the art will be familiar with common methods for measuring the moisture content of refrigerant. For example, the moisture analysis unit may measure the water dew point of the refrigerant. As used herein, the water dew point is the temperature (at a particular pressure) at which condensate begins to form. Water dew point may be measured manually or automatically. One of skill in the art will recognize methods suitable for measuring water dew point of refrigerant. For example, in an automatic system, a sample of refrigerant may be conveyed over a chilled mirror on which the formation of condensate is detectable by a change in the light reflecting off the mirror.

The moisture removal unit may be a desiccant-based system. For example, the moisture removal unit may include a chamber with desiccant bed and an area through which vaporized or gas refrigerant may be conveyed such that it contacts desiccant in the bed. The desiccant may be any well-known hygroscopic material. A number of suitable desiccants are used and well known in the art, for example, silica, activated charcoal, calcium sulfate (gypsum), calcium chloride, molecular sieves, and combinations thereof.

Desiccant may be regenerated for continued or recycled use or the desiccant may be used, discarded, and replaced with fresh desiccant. Regeneration of desiccant may be carried out by methods well known in the art, for example, by drying the desiccant in an oven.

Conduits connecting the moisture removal unit to other components within the refrigeration circuit may also include valves/valve bodies. The moisture removal methods and equipment disclosed herein may be used in any type of refrigeration circuit, including, but not limited to, those well known in the art such as the cascade cycle, the mixed refrigerant cycle, the gas-expander cycle, or any combination thereof.

The refrigeration circuit may also contain piping, tubing, valves, valve bodies, and the like for connecting and directing flow from one component to another. As used herein, these components are collectively called "conduits." As used herein, a "conduit" forms an enclosed passageway through which refrigerant flows or can flow and can be or include one or more sections of tubing or pipe, one or more passageways through one or more other components such as fittings, valve bodies, accumulators, or a combination thereof, as examples. Further, conduits described herein as "connecting" two components provide an enclosed passageway between the two components through which refrigerant flows or can flow, at least in one or more modes of operation. Moreover, refrigerant conduits described herein may differ in shape or length from what is shown on the drawings, which are not drawn to scale.

The term "refrigerant," as used herein, refers to refrigerant in a liquid, vapor, or gas form, or any combination thereof. Components of the closed circuit cause the refrigerant to undergo temperature/pressure changes. Depending on its location in the refrigeration circuit, the refrigerant will be liquid, vapor, or gas. The temperature/pressure changes of the refrigerant result in energy transfer. Refrigerant may be a single gas component or a mixture of gas components ("mixed refrigerant" or MR). Examples of suitable refrigerants include those well known in the art, for example, methane, ethane, propane, ethylene, nitrogen, and any combination or mixture thereof. Refrigerants may also contain impurities, moisture, or both.

As used herein, the terms "moisture" and "water" are synonymous with each other and used interchangeably. Moisture may be present in the refrigeration circuit in liquid water form, in vapor form, in gas form, in ice form, or any combination thereof. Sources of water include, but are not limited to, initial refrigerant charge, make-up refrigerant, and combinations thereof. The present disclosure provides methods for removing any water that is introduced into the circuit by any means.

As used herein, "dehydrated" refers to refrigerant that has at least a portion of water removed when compared to its state in the refrigerant source. The amount of water within the refrigerant may be indicated by the refrigerant's water dew point. The relationship of water dew point to the saturation or percent of water the refrigerant depends on the pressure of the refrigerant, but one of skill in the art can easily convert dew point to a percent measurement based on a well-known and easily determined relationship. Thus, the refrigerant that exits the moisture removal system may have between about 98% to about 100% of water removed, which includes 98%-99%, 98.5%-99%, 99-99.5%, 99%-100%, and 99.5%-100%. As used herein, 100% removal of water means that the refrigerant may have no detectable level of water. In any embodiment, the methods herein may be able to remove moisture from circulating refrigerant sufficiently such that there is no detectable level of water in the refrigerant.

FIG. 1 shows a scheme of a refrigeration circuit 1 utilizing a moisture removal unit 11. FIG. 1 is a general illustration and other components can be included in the refrigeration circuit 1 to ensure the proper and safe operation of the refrigeration circuit 1. The refrigeration circuit 1 includes a compressor 3, a condenser 5, a heat exchanger 7, and a moisture removal unit 11. Optionally, a moisture analysis unit 29 may be included and some or all of refrigerant may be conveyed through conduit 20 to the moisture analysis unit 29 then back to the refrigeration circuit through conduit 22. In configurations where moisture analysis unit 29 is not present or where only a portion of the refrigerant is conveyed through conduit 20 to moisture analysis unit 29, all or the rest (respectively) of the refrigerant may be conveyed through moisture removal unit 11 and return to the refrigeration circuit 1 through conduit 18. FIG. 1 depicts refrigerant being conveyed through moisture analysis unit 29 downstream of moisture removal unit 11 and prior to rejoining the refrigeration circuit 1, however, moisture analysis unit 29 may be incorporated anywhere in the refrigeration circuit 1 where the refrigerant is a gas. For example, the moisture analysis unit 29 may be located downstream of the moisture removal unit 11 after the refrigerant passing through the moisture removal unit 11 has rejoined the refrigeration circuit 1. The moisture analysis unit and any necessary conduits may be incorporated into or in parallel with conduit 24.

Additional components in the refrigeration circuit 1 can include, but are not limited to, distributors, filters, valves, pressure meters, sensors, and the like, and combinations thereof. As used herein, when a figure depicts a solid line connecting two components (including those with arrowheads), the line is used as a general term to encompass the line or lines that fluidly connect the two components and the other hardware like pumps, connectors, piping/tubing, and valves that may be installed along the line. As used herein, arrowheads depict the direction of refrigerant flow when the refrigeration circuit 1 is in use for cryogenic processing (e.g., cooling). The refrigeration circuit 1 in FIG. 1 conveys refrigerant from a compressor 3 to a condenser 5 and from the condenser 5 to a heat exchanger 7. In FIG. 1, a moisture removal unit 11 is downstream of compressor 3 and upstream of condenser 5 such that refrigerant is conveyed from the compressor 3 by way of conduit 17 through the moisture removal unit 11 to the condenser 5 by way of conduit 24.

The refrigeration circuit 1 may have one or more valves 16, 19 that control flow direction, split the refrigerant stream, or both. Optional valve 19 may direct refrigerant leaving the compressor 3 to bypass any moisture removal unit 11 by following conduit 15 or through the moisture removal unit 11 by following conduit 17. Alternatively, the valve 19 may split the refrigerant stream into to two streams, with one stream following conduit 15 to bypass the moisture removal unit 11 and the other stream following conduit 17 through the moisture removal unit 11. Optional valve 16 may direct refrigerant leaving the moisture removal unit 11 to the moisture analysis unit 29 by following conduit 20 or bypass the moisture removal unit 29 by following conduit 18. The configuration of the refrigeration circuit 1 shown in FIG. 1 may be a useful configuration for removal of moisture either in methods where system is taken offline and warmed prior to cycling refrigerant through the moisture removal unit or in methods where no warming is needed. As used herein, "warmed" and grammatical variations thereof, refers to the refrigeration circuit where the temperature of the refrigerant downstream of the condenser and upstream of the heat exchanger is greater than the temperature of the refrigerant at that location as it would be during operational LNG production.

The refrigeration circuit shown in FIG. 1 may include optional valves 16, 19 to split the refrigerant stream. For example, the valves may split the streams such that the stream conveyed to the moisture removal unit is between about 5% and about 15% of the total refrigerant volume. This range includes 5%-10% and 10%-15%.

Optionally, there may be a refrigerant source connected to the refrigeration circuit shown in FIG. 1 for the addition of refrigerant to the refrigeration circuit. The refrigerant source may be connected by any conduit to any part of the refrigeration circuit. In particularly useful configurations, it is connected such that refrigerant is added to the refrigeration circuit downstream of heat exchanger 7 and upstream of compressor 3.

One method for removing water from a refrigeration circuit includes the steps of warming a refrigeration circuit such as the one shown in FIG. 1. When warmed, refrigerant will be in gas or vapor form, which then may be directed through a moisture removal unit at any location within the refrigeration circuit. The refrigeration circuit may be warmed, for example, to any temperature at which the desiccant is sufficiently able to absorb water from the refrigerant. The operating temperature of a desiccant varies from desiccant to desiccant and one of skill in the art will be familiar with useful operating temperatures of suitable desiccants. In any embodiment, the refrigeration circuit may be warmed, for example, to ambient temperature. As used herein, "ambient" temperature refers to the temperature of the air surrounding the refrigerant circuit and the temperature to which the circuit would equilibrate when taken offline.

For example, using a system such as shown in FIG. 1, refrigerant may be conveyed through a compressor 3 after which all or part of the refrigerant stream, depending on manipulation of an optional valve 19, may be conveyed through a moisture removal unit 11. Valve 19 may direct refrigerant to follow conduit 15 or conduit 17. Valve 19 may alternatively split the gas stream into a first stream and a second stream and direct the first stream towards conduit 15, bypassing the moisture removal unit 11, and direct the second stream towards conduit 17 to the moisture removal unit 11. Refrigerant bypassing the moisture removal unit 11 will travel towards condenser 5 by way of conduit 24, joining refrigerant leaving the moisture removal unit 11 through conduit 18. Refrigerant is conveyed through the condenser 5 to the heat exchanger 7 as it finishes the refrigeration circuit 1 and heads towards the compressor 3 again. Optionally, refrigerant leaving the moisture removal unit 11 may be conveyed through a moisture analysis unit 29 by way of conduit 20. Some or all of the refrigerant may be routed to conduit 20 by way of optional valve 16.

In another method, warming and taking the refrigeration circuit offline is not necessary and refrigerant may be conveyed through the moisture removal unit during normal operation of the refrigeration circuit. As refrigerant should be in the gas or vapor phase when passing through the moisture removal unit, the moisture removal unit may be incorporated into the refrigeration circuit after the compressor and before the condenser, as shown in FIG. 1. To remove moisture from the refrigerant, all or part of the refrigerant stream, depending on manipulation of an optional valve 19, may be conveyed to a moisture removal system 11. Valve 19 may direct refrigerant to follow conduit 15 or conduit 17. Valve 19 may also split the gas stream into a first gas stream and a second gas stream and direct the first gas stream towards conduit 15, bypassing the moisture removal unit 11, and direct the second gas stream towards conduit 17 to the moisture removal unit. Refrigerant bypassing the moisture removal unit 11 will travel towards condenser 5, joining refrigerant leaving the moisture removal unit 11. Refrigerant may be conveyed to condenser 5 to cool and liquefy the refrigerant. Liquefied refrigerant is then conveyed to heat exchanger 7 to liquefy a natural gas stream (not shown) as it finishes the refrigeration circuit 1 and is conveyed to the compressor 3 again.

Figure 2:
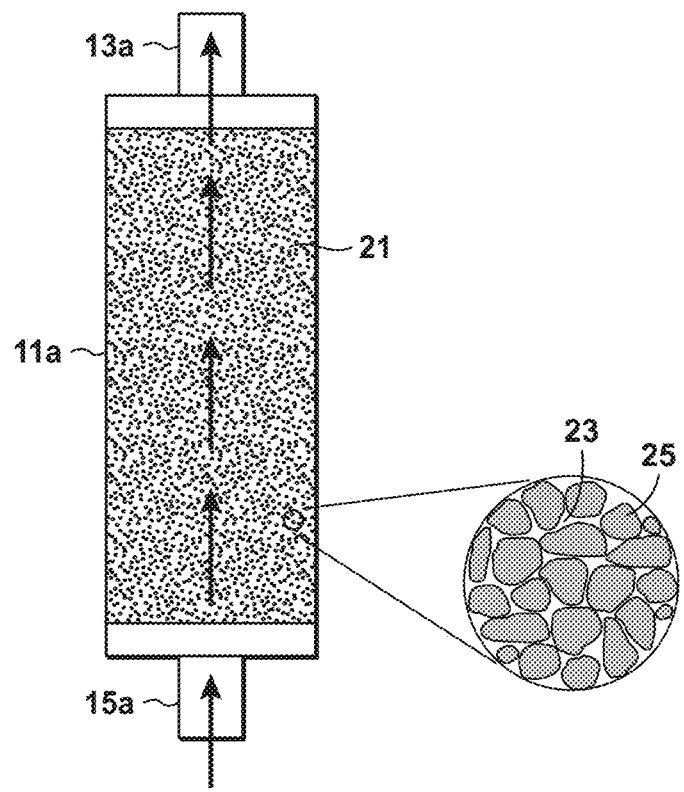
FIG. 2 illustrates a nonlimiting example of a contemplated moisture removal unit wherein a refrigerant stream is conveyed through a bed of desiccant.

The moisture removal unit may be a desiccant-based system. For example, the moisture removal unit may include a chamber with desiccant bed and an area through which vaporized or gas refrigerant may be conveyed such that it contacts the desiccant in the bed. Referring now to FIG. 2, the refrigerant (denoted by open-head arrows) may enter the moisture removal unit 11a through conduit 15a, pass through voids 23 between solid desiccant particles 25 within the desiccant bed 21, and then exit the moisture removal unit 11a through conduit 13a. The moisture removal unit may allow cycling of refrigerant past or through the desiccant bed multiple times. After a desired number of cycles and a desired level of dehydration of refrigerant, refrigerant may re-enter the refrigeration circuit.

In any embodiment, the moisture removal unit may be a permanent fixture in the refrigeration circuit wherein refrigerant continuously flows through the moisture removal unit during operation. Alternatively, the moisture removal unit may remain offline until a desired time at which appropriate valves are manipulated to direct refrigerant to the moisture removal unit. Alternatively, a moisture removal unit may be removable such that at a desired time, the moisture removal unit may be attached to the refrigeration circuit and appropriate valves are manipulated to direct refrigerant to the moisture removal unit. For example, the moisture removal unit may be mounted on a movable platform, for example, a trailer that may be towed by a vehicle. After a desired cycle time, the moisture removal unit may be removed for use in a different refrigeration circuit or LNG train. Alternatively, the moisture removal unit may be a facility moisture removal unit and at a desired time, refrigerant may be directed through piping to the facility moisture removal unit. FIG. 1 depicts a refrigeration circuit having a single moisture removal unit 11; however it is contemplated that a refrigeration circuit may incorporate multiple moisture removal units. For example, a refrigeration circuit may incorporate a moisture removal unit both downstream of the heat exchanger and downstream of the compressor.

Figure 3:
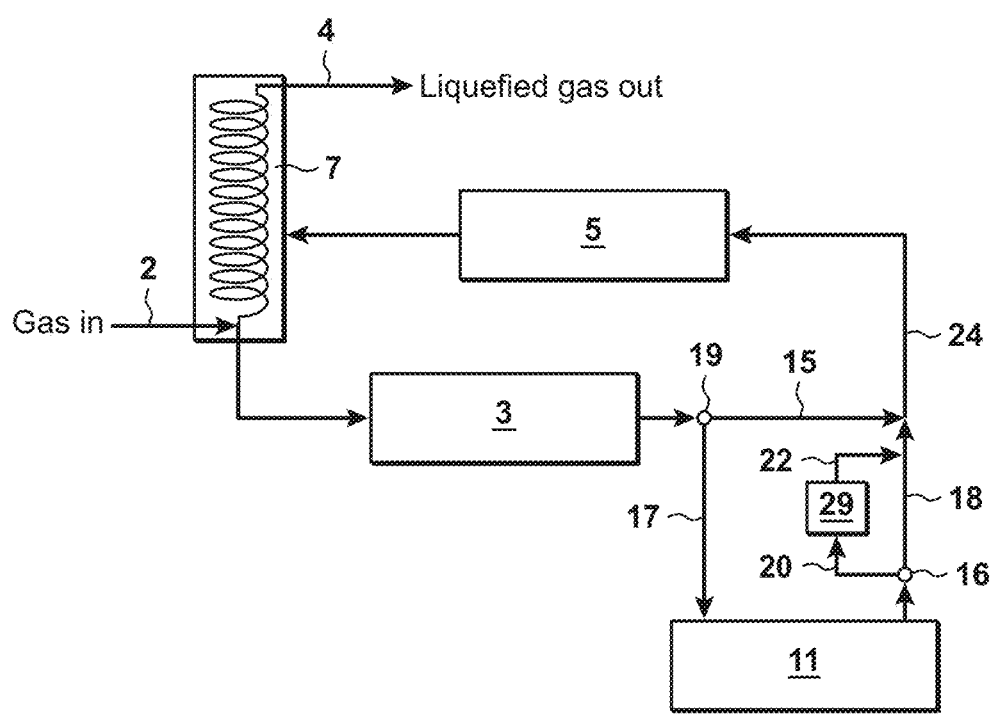
FIG. 3 illustrates a nonlimiting example of a contemplated moisture removal unit where a refrigerant stream is conveyed over a bed of desiccant.

In another method, the present disclosure provides a method for liquefying a gas stream using a system incorporating a moisture removal unit, for example, as shown in FIG. 3. The method may include the steps of:

a) providing the gas stream;
b) providing refrigerant;
c) compressing the refrigerant to provide compressed refrigerant;
d) conveying at least a portion of the compressed refrigerant through a moisture removal unit;
e) cooling and condensing the compressed refrigerant to provide cooled refrigerant;
f) conveying the cooled refrigerant to a heat exchanger; and
g) passing the gas stream through the heat exchanger to cool at least part of the gas stream by indirect heat exchange with the cooled refrigerant.

In FIG. 3, all numbered elements are identical as were identified in FIG. 1. Additionally, the flow of the gas stream is depicted entering and exiting the heat exchanger 7. The gas stream, e.g., natural gas, enters the heat exchanger 7 by way of conduit 2 where cooled condensed refrigerant absorbs energy from the natural gas, liquefying the gas. The liquefied gas then exits the heat exchanger 7 by way of conduit 4. The gas stream may be rich in methane, for example, natural gas. Natural gas contains, as its primary component (e.g., greater than 87 mole percent), methane, but may have other components such as ethane, propane, isobutene, n-butane, isopentane, n-pentane, hexanes, nitrogen, carbon dioxide, hydrogen, oxygen, sulfur, water, or any combination thereof. As noted above, refrigerant may be any type of refrigerant or mixtures of refrigerants, for example, methane, nitrogen, ethane, ethylene, propane, other commercial refrigerant compounds, or combinations thereof. Refrigerant may be compressed. All or a portion of the refrigerant, after being compressed, may be conveyed through a moisture removal unit, which may contain a bed of desiccant to absorb any water in the refrigerant. The refrigerant may then be conveyed to a condenser that liquefies and cools the refrigerant. The cooled refrigerant may then be conveyed to a heat exchanger such that energy from a gas stream, which is concurrently being conveyed through a different portion of the heat exchanger, is transferred to the cooled refrigerant, resulting in liquefaction of the gas stream.

In any embodiment described herein, refrigerant downstream of the moisture removal unit 11 will have a lower water content that the refrigerant upstream of the moisture removal unit. The refrigerant downstream of the moisture removal system may be fully dehydrated or partially dehydrated with respect to the refrigerant entering the moisture removal unit. The efficiency of dehydration may depend on a variety of factors, including initial water content, amount of desiccant, type of desiccant, physical properties of the desiccant (such as surface area, size, shape), and the amount of time the refrigerant spent in the moisture removal unit. Refrigerant may cycle through the moisture removal unit more than one time.

In any embodiment disclosed herein, refrigerant may be allowed to cycle through the refrigeration circuit, including the moisture removal unit, for a desired period of time that may depend on how long it takes the refrigerant to make a complete cycle through the refrigeration circuit and the desired number of cycles through the refrigeration circuit. One of skill in the art will be able to modify equipment to achieve desired dehydration results. Fully or partially dehydrated gas may cause sublimation of ice deposits or vaporization of water deposits elsewhere in the refrigeration circuit upon contact with the fully or partially dehydrated gas. The water vapor may then join the gas stream and be subjected to the moisture removal unit downstream.

Using the methods disclosed herein and by removing moisture from refrigerant, the frequency of water pooling in refrigeration circuit component (e.g., heat exchangers) may be reduced compared to frequency of pooling when no moisture removal unit is utilized. It is contemplated that conventional "de-frosting" processes may not be necessary or may be performed less frequently with implementation of one of the many embodiments of a moisture removal unit within the refrigeration circuit as disclosed and described herein. By using the methods and systems disclosed herein, the time required between de-frosting may be increased when compared to a method that does not use moisture removal units. It is contemplated that in some instances, de-frosting may not be required at all to maintain standard and continued operation of the refrigeration circuit for cryogenic processing.

Example Embodiments

One nonlimiting example embodiment is a system for removing moisture from refrigerant in an LNG refrigeration circuit comprising: a refrigerant compressor; a refrigerant condenser; a moisture removal unit comprising desiccant; and a heat exchanger that are fluidly connected in a loop where the refrigerant compressor is upstream of the moisture removal unit, the moisture removal unit is upstream of the refrigerant condenser, the refrigerant condenser is upstream of the heat exchanger, and the heat exchanger is upstream of the refrigerant compressor. Optionally, the embodiment can further include one or more of the following: Element 1: the system further comprising a valve that is capable of splitting a refrigerant stream into a first stream and a second stream; Element 2: wherein the moisture removal unit is removably attached to the system; Element 3: wherein the refrigerant flows through a packed bed of desiccant within the moisture removal unit; Element 4: wherein the desiccant is selected from the group consisting of silica, activated charcoal, calcium sulfate, calcium chloride, molecular sieves, and combinations thereof; Element 5: the system further comprising a conduit for fluidly connecting a refrigerant source to the refrigeration circuit; Element 6: the system further comprising a moisture analysis unit downstream of the moisture removal unit; Element 7: Element 6 and wherein the moisture analysis unit measures the dew point of the refrigerant. Examples of combinations include, but are not limited to, Element 1 in combination with one or more of Elements 2-7; Element 2 in combination with one or more of Elements 3-7; Element 3 in combination with one or more of Elements 4-7; Element 4 in combination with one or more of Elements 5-7; Element 5 in combination with one or more of Elements 6-7; and Elements 6 and 7 in combination.

Another nonlimiting example embodiment is a method for removing moisture from refrigerant in a LNG refrigeration circuit comprising: conveying a refrigerant stream from a compressor to a moisture removal unit; conveying the refrigerant stream through the moisture removal unit comprising a desiccant; and conveying the refrigerant stream from the moisture removal unit to a condenser. Optionally, the embodiment can further include one or more of the following: Element 2; Element 4; Element 8: wherein the refrigeration circuit is at ambient temperature; and Element 9: the method further comprising dividing the refrigerant stream into a first stream and a second stream, and conveying the second stream to the moisture removal unit. Examples of combinations include, but are not limited to, Elements 2 and 4 in combination and optionally in further combination with Element 8 and/or Element 9; Elements 8 and 9 in combination and optionally in further combination with Element 2 and/or Element 4; Elements 2 and 8 in combination and optionally in further combination with Element 4 and/or Element 9; Elements 4 and 9 in combination and optionally in further combination with Element 2 and/or Element 8; Elements 2 and 9 in combination and optionally in further combination with Element 4 and/or Element 8; and Elements 4 and 8 in combination and optionally in further combination with Element 2 and/or Element 9.

Yet another nonlimiting example embodiment is a method of cryogenically processing LNG, said process comprising the steps of: compressing a refrigerant; conveying at least a portion of the refrigerant to a moisture removal unit comprising a desiccant to form dehydrated refrigerant; cooling and condensing the dehydrated refrigerant to provide a cooled dehydrated liquid refrigerant; conveying the cooled dehydrated refrigerant to a heat exchanger; and passing a LNG stream rich in methane through the heat exchanger to cool at least part of the LNG stream by indirect heat exchange with the cooled dehydrated refrigerant.

Optionally, the embodiment can further include one or more of the following: Element 2; Element 4; Element 9; Element 10: wherein the LNG stream comprises 87 percent by mole to 97 percent by mole methane; and Element 11: the method further comprising conveying some or all of the at least a portion of the refrigerant to a moisture analysis unit downstream of the moisture removal unit. Examples of combinations include, but are not limited to, Elements 2 and 4 in combination and optionally in further combination with one or more of Elements 9-11; two or more of Elements 9-11 in combination and optionally in further combination with Element 2 and/or Element 4; and one or more of Elements 9-11 in combination with combination with Element 2 and/or Element 4.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A system comprising:
a refrigerant compressor;
a refrigerant condenser;
a moisture removal unit comprising a desiccant; and
a heat exchanger that are fluidly connected in a refrigeration circuit in which the refrigerant compressor is upstream of the moisture removal unit, the moisture removal unit is upstream of the refrigerant condenser, the refrigerant condenser is upstream of the heat exchanger, and the heat exchanger is upstream of the refrigerant compressor;
wherein the refrigeration circuit is split into a first stream passing through the moisture removal unit and a second stream passing through a conduit bypassing the moisture removal unit.

2. The system of claim 1, further comprising a valve capable of directing the second stream through the conduit.

3. The system of claim 2, wherein the moisture removal unit is removably attached to the refrigeration circuit.

4. The system of claim 1, wherein the moisture removal unit contains a packed bed of the desiccant.

5. The system of claim 1, wherein the desiccant is selected from the group consisting of silica, activated charcoal, calcium sulfate, calcium chloride, molecular sieves, and combinations thereof.

6. The system of claim 1, further comprising:
a refrigerant source fluidly connected to the refrigeration circuit.

7. The system of claim 1, further comprising a moisture analysis unit downstream of the moisture removal unit, the moisture analysis unit measuring a dew point of a refrigerant within the refrigeration circuit, and the moisture analysis unit comprising a chilled mirror over which the refrigerant is conveyed and formation of condensate upon the chilled mirror is detectable by a change in light reflecting off the chilled mirror.

8. A method comprising:
conveying a refrigerant stream from a refrigerant compressor, a first portion of the refrigerant stream being conveyed to a moisture removal unit containing a desiccant and a second portion of the refrigerant stream being conveyed through a conduit that bypasses the moisture removal unit;
conveying the first portion of the refrigerant stream through the moisture removal unit;
rejoining the first portion of the refrigerant stream with the second portion of the refrigerant stream to form a rejoined refrigerant stream; and
conveying the rejoined refrigerant stream to a refrigerant condenser.

9. The method of claim 8, wherein the desiccant is selected from the group consisting of silica, activated charcoal, calcium sulfate, calcium chloride, molecular sieves, and combinations thereof.

10. A method comprising:
compressing a refrigerant;
conveying a first portion of the refrigerant after compression thereof through a moisture removal unit containing a desiccant to form dehydrated refrigerant;
conveying a second portion of the refrigerant after compression thereof through a conduit that bypasses the moisture removal unit;
rejoining the first portion of the refrigerant with the second portion of the refrigerant downstream from the moisture removal unit to form a rejoined refrigerant stream comprising the dehydrated refrigerant;
cooling and condensing the rejoined refrigerant stream comprising the dehydrated refrigerant to provide a cooled dehydrated liquid refrigerant;
conveying the cooled dehydrated liquid refrigerant to a heat exchanger; and
passing a liquid natural gas (LNG) stream comprising at least methane through the heat exchanger to cool at least part of the LNG stream by indirect heat exchange with the cooled dehydrated liquid refrigerant.

11. The method of claim 10, wherein the desiccant is selected from the group consisting of silica, activated charcoal, calcium sulfate, calcium chloride, molecular sieves, and combinations thereof.

12. The method of claim 10, wherein the LNG stream comprises 87 percent by mole to 97 percent by mole methane.

13. The method of claim 10, wherein the moisture removal unit is removably attached to a conduit extending between a compressor that compresses the refrigerant and the moisture removal unit.

14. The method of claim 10, further comprising conveying at least a portion of the dehydrated refrigerant to a moisture analysis unit downstream of the moisture removal unit, the moisture analysis unit measuring a dew point of the dehydrated refrigerant, and the moisture analysis unit comprising a chilled mirror over which the dehydrated refrigerant is conveyed and formation of condensate upon the chilled mirror is detectable by a change in light reflecting off the chilled mirror.

* * * * *

UNITED STATES PATENT AND TRADEMARK OFFICE
CERTIFICATE OF CORRECTION

PATENT NO. : 11,415,348 B2
APPLICATION NO. : 16/735036
DATED : August 16, 2022
INVENTOR(S) : Daryl A. Kenefake, Jeffrey Tatarzyn and Waleed H. Amhed Page 1 of 1

It is certified that error appears in the above-identified patent and that said Letters Patent is hereby corrected as shown below:

On the Title Page

Item (72) Inventors: should read:
"Daryl A. Kenefake, The Woodlands, TX (US); Jeffrey Tatarzyn, Spring, TX (US); Waleed H. Ahmed, Spring, TX (US)"

Signed and Sealed this
Fourth Day of October, 2022

Katherine Kelly Vidal
*Director of the United States Patent and Trademark Office*